United States Patent [19]

Kawaguchi

[11] 4,212,498
[45] Jul. 15, 1980

[54] DUAL TYPE HYDRAULIC CIRCUIT FOR A VEHICLE BRAKE

[75] Inventor: Hiroshi Kawaguchi, Mishima, Japan

[73] Assignee: Toyota Jidosha Kogyo Kabushiki Kaisha, Aichi, Japan

[21] Appl. No.: 961,602

[22] Filed: Nov. 17, 1978

[30] Foreign Application Priority Data

Nov. 19, 1977 [JP] Japan .................. 52-139128

[51] Int. Cl.² .............................................. B60T 8/26
[52] U.S. Cl. ............................... 303/6 C; 303/84 R
[58] Field of Search ............... 188/345, 349; 303/6 C, 303/6 R, 22 R, 84 R

[56] References Cited

U.S. PATENT DOCUMENTS

| 3,586,384 | 6/1971 | Falk | 303/6 C |
| 3,804,468 | 4/1974 | Ishikawa et al. | 303/6 C |
| 3,969,000 | 7/1976 | Ohta et al. | 303/6 C |

*Primary Examiner*—Duane A. Reger
*Attorney, Agent, or Firm*—Browdy and Neimark

[57] ABSTRACT

A dual type hydraulic circuit for a vehicle brake which comprises a control valve for controlling the hydraulic pressure in the rear wheel cylinders such that the distribution of braking pressure to the front and rear wheels may be appropriate in either cases, when both circuits are in normal function or when one circuit is faulty. The control valve includes a proportioning valve with a valve piston for opening and closing a fluid passage to the rear wheel cylinder, and a differential piston for controlling the operation of the valve piston in accordance with the hydraulic pressure in the both hydraulic circuits acting on its two pressure-receiving faces dissimilar in the respective area. The differential piston is provided with a small diameter portion and a large diameter portion, being constantly biased in an direction away from the control valve piston, in order to keep a distance larger than the space necessitated for the valve piston stroke to do a controlling operation, while being in confrontation at its small diameter portion to the valve piston. The large diameter portion of the differential piston receives the pressure, on its smaller pressure-receiving face on the nearer side to the smaller diameter portion, in the hydraulic circuit which is not controlled by the control valve, and the other pressure, on the larger pressure-receiving face thereof, in the hydraulic circuit controlled by the control valve.

8 Claims, 5 Drawing Figures

DUAL TYPE HYDRAULIC CIRCUIT FOR A VEHICLE BRAKE

BACKGROUND OF THE INVENTION

This invention relates to a dual type hydraulic circuit for a vehicle brake, more particularly, to one which is capable of maintaining proper distribution of braking power to the front and the rear wheels, not only when both braking fluid circuits are in normal function but even when either one circuit is faulty, i.e., has fallen into a pressure failure by any cause.

It has recently been conventional to divide a vehicle braking system into two mutually independent ones, with the object of enhancing running safety, such that when one circuit should have a failure during a drive the other remaining one may be capable of braking the vehicle.

Another popular attempt is to dispose a proportioning valve (hereinafter called a P valve), which is aimed to so control the fluid pressure to the rear wheel cylinder as it rises at a milder gradient than the rising gradient of pressure in the master cylinder when the fluid pressure in the master cylinder rises exceeding a certain predetermined value. It is of course necessary to halt a vehicle, effectively as well as safely (conditions required for this will be called hereinafter an ideal condition), without incurring a so-called locking-up phenomenon (slipping phenomenon between the ground and the rotation-ceased vehicle wheels) to the front and rear wheels.

Combined practice of the dual circuit system and the P valve concept is, however, accompanied by a new problem from a view point of safety. As the P valve mainly aims to control the pressure to the rear wheel cylinder, when both braking systems are normal in function, so as to properly arrange or balance the ratio between the front wheel braking power and the rear wheel braking power, it often contains another disadvantage, that is, in a case of either one circuit having become faulty in raising its pressure due to a conduit breakage or other failure (hereinafter called a one-circuit-failure case), the P valve restricts the rear wheel braking power smaller than it ought to be. When a one-circuit-failure case arises the deceleration rate of a vehicle becomes, as can be easily imagined, smaller than in a case wherein both circuits are in normal (hereinafter called a both-circuits-normal case), so the resultant decrease of forward load transfer brings about a decrease of load reduction on the rear wheels. It means that making the rear wheel braking power larger than that in a both-circuits-normal case will not result in a locking or locking-up of the rear wheels. The P valve inevitably restricts the rear wheel cylinder pressure just like in a both-circuits-normal case, when it is not so required, which means an adverse restriction of the desirable raising of the rear wheel cylinder pressure.

In view of such a situation various attempts and devices have been made so far, providing for a one-circuit-failure case, such as limiting or halting the function of the P valve temporarily or by-passing purposely the pressured fluid without passing through the P valve, in order to fully raise the rear wheel braking power. All of these, however, have disadvantageous in some respects irrespective of effectiveness in some respects. The present invention has been made from such a background.

SUMMARY OF THE INVENTION

It is therefore a primary object of this invention to provide a braking system which is capable of halting a vehicle safely and effectively irrespective of the vehicle being in either the both-circuits-normal condition or the one-circuit-failure condition.

It is another object of this invention to provide, speaking more particularly, a hydraulic circuit which is able to substantially adapt to either ideal conditions, being mutually different in essence, in both-circuits-normal and one-circuit-failure case.

It is further object of this invention to provide a supplementary piston (a differential piston), for altering the operation characteristic of the P valve in the event of one-circuit-failure.

It is also an important object of this invention to provide the above-mentioned hydraulic circuit as simple in construction as is possible, highly reliable and inexpensive in its manufacturing cost.

In a hydraulic circuit for a dual type brake system in accordance with this invention, provided with a pair of mutually independent conduit systems for delivering the braking pressure generated in the master cylinder to each of the wheel cylinders disposed on each of the front- and rear wheels, and a P valve with a valve piston, for controlling the rising gradient of the hydraulic pressure to the rear wheel cylinder disposed on the rear wheel, when the pressure in the master cylinder rises exceeding a predetermined value. A differential piston is disposed in confrontation to one end of the valve piston with a larger distance between the latter than the amount of movement required for the valve piston when it controls the rear wheel cylinder pressure. The differential piston is provided with a small diameter portion and a large diameter portion; (1) the small diameter portion faces at one end thereof the valve piston, (2) the large diameter portion, formed in continuation of the former, is provided with a first pressure-receiving face on the nearer side to the small diameter portion and a second pressure-receiving face on the opposite side larger in area than the first pressure-receiving face, and the second pressure-receiving face is affected by the master cylinder pressure in the circuit under the control of the P valve and the first pressure receiving face is affected by the pressure from the other circuit (outside the P valve control), and (3) the differential piston is constantly biased by a spring in an direction away from the valve piston.

DETAILED DESCRIPTION OF THE PREFERRED EMBODIMENTS

Figure 1:
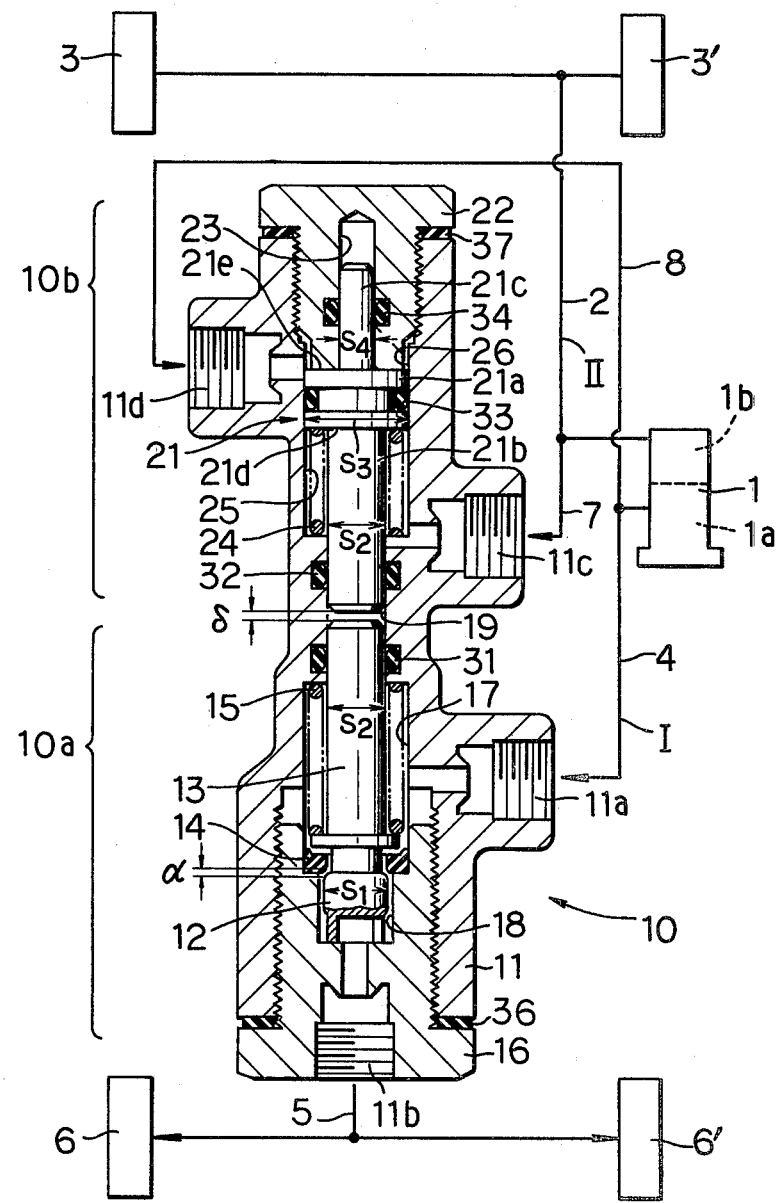
FIG. 1 is a diagram of a dual type hydraulic circuit of an embodiment in accordance with this invention.

In FIG. 1 a tandem type master cylinder is designated at 1, in which hydraulic pressure belonging to two mutually independent circuits is produced in a first and a second pressure chambers 1a, 1b in response to a suitable operation of, for example, a brake pedal (not shown). The fluid pressure produced in the second pressure chamber 1b is led to, via a conduit 2, front wheel cylinders 3, 3' disposed on the left- and right front wheels; the fluid pressure produced in the first pressure chamber 1a is, on the contrary, led to rear wheel cylinders 6, 6' disposed on the left- and right rear wheels, through a conduit 4, a first port 11a and a second port 11d disposed on a housing 11 of a control valve 10, and a conduit 5. As can be understood in the above description the hydraulic circuit in this embodiment belongs to a so-called front- and rear type of dual circuit.

The control valve 10 is composed of a proportioning valve portion 10a and a controlling portion 10b for controlling the former's operation. The proportioning valve portion 10a includes a valve piston 13, on one end thereof being fixed a valve poppet 12, a valve seat 14 acting valve operation for shutting a passage of the braking fluid with the aid of the valve poppet 12, and a first compression spring 15 constantly biasing the valve piston 13 in a direction wherein the valve poppet 12 is to be moved from the valve seat 14.

This proportioning valve portion 10a delivers faithfully the hydraulic pressure in the master cylinder 1 while the pressure is in a low level to the rear wheel cylinders 6, 6', but functions, when the pressure in the master cylinder 1 rises to a valve exceeding the predetermined value, to restrict the rising gradient of the rear wheel cylinder pressure milder than that in the master cylinder 1. That is to say, its function is similar to that of the ordinary proportioning valves.

A plug 16 is threaded into the housing 11 for forming an inlet chamber 17 and an outlet chamber 18 and concurrently for functioning as a stopper for the valve piston 13.

The valve piston 13 is, on the other end opposite the poppet 12 exposed to an air chamber 19 formed in the middle portion of the housing 11. In air chamber 19 a controlling portion of a differential piston 21 is adjacent to the valve piston 13. The differential piston 21 is a stepped piston composed of a central large diameter portion 21a, and a first and a second small diameter portions 21b, and 21c protruding respectively in the opposite directions therefrom. The first small diameter portion 21b being opposite to the end of the valve piston 13 in the air chamber 19 with a clearance or space δ and the second small diameter portion 21c being exposed to another air chamber 23 formed in a plug 22 threaded into the housing 11. The differential piston 21 is constantly biased by a second spring 24 in an alienating direction from the valve piston 13, being however limited in its movement beyond a certain distance by means of abutment of the large diameter portion 21a on the inner end of the plug 22. And the distance δ between the valve piston 13 and the differential piston 21 is determined in such a manner that the same is to be slightly larger than the lift amount δ of the valve poppet 12 from the valve seat 14, i.e., the shifting amount of the valve piston 13 required for the hydraulic control operation thereof under the condition that both pistons are most widely separated from each other by the springs 15 and 24.

On either side of the large diameter portion 21a of the differential piston 21 are formed respectively a first oil chamber 26 and a second oil chamber 25, to the latter being led the hydraulic pressure in the second pressure chamber 1b of the master cylinder 1, through a conduit 7 and a third port 11c, and to the first oil chamber 26 being led the hydraulic pressure in the first pressure chamber 1a of the master cylinder 1, through a conduit 8 and a fourth port 11d. The diameter of the first small diameter portion 21b of the differential piston 21 is made larger than that of the second small diameter portion 21c, consequently the second pressure-receiving face 21d on the side of the first small diameter portion 21b is smaller in area than the first pressure-receiving face 21e formed on the side of the second small diameter portion 21c. Numerals 31, 32, 33, and 34 are all sealing rings and 36 and 37 are packings.

Operation of the thus constructed hydraulic circuit will be described, with regard to two modes of operation, both-circuits-normal condition and one-circuit-failure condition, wherein signs employed in the description respectively designate the following meaning or value:

$S_1$: transverse sectional area of the valve poppet 12

$S_2$: transverse sectional area of the valve piston 13 and the first small diameter portion 21b of the differential piston 21

$S_3$: transverse sectional area of the large diameter portion 21a of the differential piston 21

$S_4$: transverse sectional area of the second small diameter portion 21c $F_1$: set load of the first spring 15

$F_2$: set load of the second spring 24

$P_{m1}$: fluid pressure in the first pressure chamber 1a of the master cylinder 1

$P_{m2}$: fluid pressure in the second pressure chamber 1b of the master cylinder 1

$P_{rw}$: fluid pressure in the rear wheel cylinders 6, 6'

$P_o$: fluid pressure at which the proportioning valve portion 10a initiates hydraulic control operation by itself When a brake operational mechanism or brake pedal (not shown) is operated in a both-circuits-normal time, braking hydraulic pressure is generated, similarly in the two pressure chambers, at a same level. While this pressure remains at a low level the valve piston 13 and the differential piston 21 are both, positioned as shown in FIG. 1, in a non-operative condition. The master cylinder pressures $P_{m1}$ and $P_{m2}$ are respectively transmitted to the front wheel cylinders 3, 3' and the rear wheel cylinders 6, 6'. The moment the master cylinder pressure reaches $P_o$ point the valve piston 13 begins the well-known hydraulic control operation. When the pressure $P_{m1}$ in the first pressure chamber 1a of the master cylinder exceeds the pressure $P_0$, the force by the pressure $P_{m1}$ urging the valve piston 13 then becomes larger than the set load $F_1$ of the first spring 15, moving consequently the valve piston 13 toward the air chamber 19. Resulting abutment of the valve poppet 12 onto the valve seat 14 shuts the passage linking the inlet chamber 17 and the outlet chamber 18. When the pressure $P_{m1}$ in the inlet chamber 17 is later raised, so that when the sum of the valve-poppet-urging force $P_{m1} \cdot (S_1-S_2)$ by the pressure $P_{m1}$ of the inlet chamber 17 plus the set load $F_1$ of the first spring 15 becomes larger than the valve poppet urging force $P_{wr} \cdot S_1$ by the pressure $P_{wr}$ of the outlet chamber 18 the valve poppet 12 will be moved in an alienating direction from the valve seat 14, inducing the fluid to flow from the inlet chamber 17 to the outlet chamber 18. The pressure of the latter is raised to move again the valve piston 13 toward the air chamber 19; the resulting abutment of the valve poppet 12 onto the valve seat 14 interrupts again the flow of the fluid from the inlet chamber 17 to the outlet chamber 18. Owing to the repetition of this type operation the pressure $P_{wr}$ delivered to the rear wheel cylinders 6, 6' is controlled so as to rise at a milder gradient than that in the first pressure chamber 1a of the master cylinder 1 (as indicated by the AA' line in FIG. 2), while the pressure delivered to the front wheel cylinders 3, 3' is maintained at the same level with the second pressure chamber 1b of the master cylinder 1. The differential piston 21 will not initiate operation even at this situation, because the transverse sectional areas $S_2$, $S_4$ of the two small diameter portions 21b, 21c of the differential piston 21 and the set load $F_2$ of the second spring 24 are respectively predetermined so as to satisfy the following equation:

$$Po \cdot (S_2 - S_4) < F_2$$

The balance of the valve piston 13 at this time can be represented by the equation:

$$Pm_1 \cdot (S_1 - S_2) + F_1 - Prw \cdot S_1 = 0$$

Figure 2:
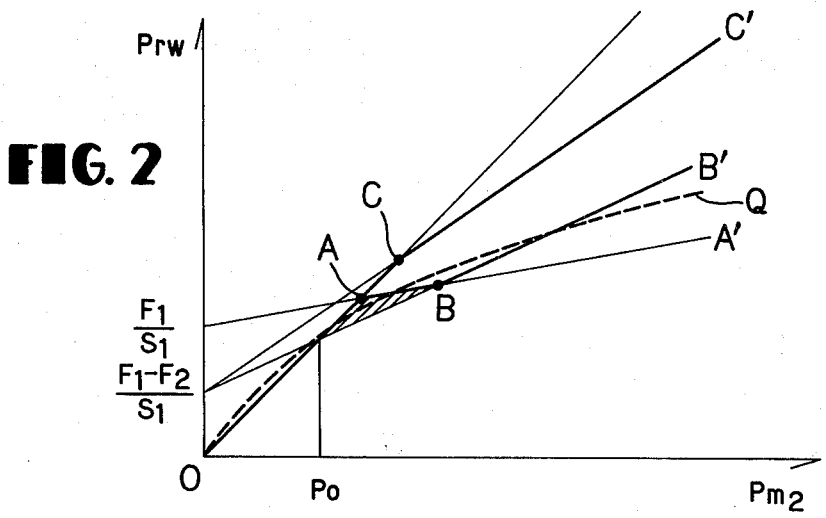
FIG. 2 is a graph showing the operation characteristics of the circuit illustrated in FIG. 1.

And the pressure in the rear wheel cylinder Prw is to describe the AA' line in FIG. 2 in an ascending gradient, wherein the straight line AA' can be represented by the following equation:

$$Prw = \frac{S_1 - S_2}{S_1} \cdot Pm_1 + \frac{F_1}{S_1}$$

When the master cylinder pressure $Pm_1$, $Pm_2$ are further raised to the condition shown in:

$$Pm_1 \cdot (S_3 - S_4) - Pm_2 \cdot (S_3 - S_2) > F_2$$

the differential piston 21 begins to move toward the valve piston 13, resisting the resilient force of the second spring 24, and finally abuts on the same. The balance of power in this condition can be represented by the following equation:

$$Pm_1 \cdot (S_1 - S_2) + F_1 - Prw \cdot S_1 + Pm_1 \cdot (S_3 - S_4) - Pm_2 \cdot (S_3 - S_2) - F_2 = 0$$

Therefore, the pressure in the rear wheel cylinders Prw is to ascend along the straight line BB' in FIG. 2, wherein the line BB' can be represented by the equation:

$$Prw = \frac{(S_1 - S_2) + (S_3 - S_4)}{S_1} \cdot Pm_1 - \frac{S_3 - S_2}{S_1} \cdot Pm_2 + \frac{F_1 - F_2}{S_1}$$

It means, as can be understood from FIG. 2, that the rear wheel cylinder pressure Prw is raised higher by that much, which is illustrated in FIG. 2 by hatching, in comparison to the case wherein the pressure takes the ascending line BB' from the outset. The braking effect to the rear wheels is naturally improved in the range of the normal pressure, i.e., leftward of the point B. As a matter of fact, braking operation in the range of normal pressure occupies more than 80% of the total brake operation, so the improvement of braking effect in this sphere is quite significant.

Although the rear wheel cylinder pressure Prw, when the braking effect to the rear wheels is thus improved, will temporarily ascend exceeding the well-known ideal line Q, giving the rear wheels a touch of locking, a continuous raising of the master cylinder pressure will render the rear wheel cylinder pressure Prw, which runs upward along the straight line AA', coming below the ideal line Q again. The slight touch of locking of the rear wheels will soon be released, and afterwards the rear wheel cylinder pressure Prw begins to ascend along the steeper line BB', without sacrificing the braking effect to the rear wheels even under a high braking pressure.

The operation under a one-circuit-failure condition will be explained next. Assume a case wherein the rear braking circuit gets into a trouble, then the pressure $Pm_1$ in the first pressure chamber 1a in the master cylinder 1 will not rise, leaving the pressure $Pm_2$ in the second pressure chamber 1b to rise. In the control valve 10 the hydraulic pressure is supplied only to the third port 11c, and the differential piston 21, which is maintained in its retracted position by the second spring 24, will not be actuated even when the pressure is supplied to the third port 11c. The braking fluid discharged from the second pressure chamber 1b is therefore to be totally supplied to the front wheel cylinders 3, 3', without being uselessly consumed in the control valve 10. It is of great significance that the braking fluid is totally effectively utilized within the circuit in normal function as in this embodiment, because there is a tendency of a pedal stroke shortage in such a conduit failure case due to increase of the idle pedal stroke.

Secondly assume a case wherein a failure occurred in the front braking circuit. The pressure $Pm_2$ in the second pressure chamber 1b will not rise, only the pressure $Pm_1$ in the first pressure chamber 1a is built up. When the pressure $Pm_1$ rises to reach the Po point the valve piston 13 of the proportioning valve portion 10a tends to initiate the hydraulic pressure control operation. At this moment the differential piston 21 of the controlling portion 10b is in abutment on the valve piston 13, having moved resisting the resilient force of the second spring 24. The pressure $Pm_2$ in the second pressure chamber 1b, which affects the second oil chamber 25 in a both-circuits-normal time, becomes powerless, so the differential piston 24 can initiate the operation under a lower pressure than Po. That is, the following inequation accounts for the phenomenon, provided that the transverse cross-sectional areas of the two small diameter portions of the differential piston 21 and the set load of the second spring 24 are predetermined so as to satisfy the inequation:

$$Po \cdot (S_3 - S_4) > F_2$$

In this situation the valve piston 13 is not allowed to operate unless it moves together with the differential piston 21. It means that the pressure necessary to actuate the valve piston 13 has been raised that much in comparison to the both-circuits-normal time. The balance of power at this time is represented by the equation:

$$Pm_1 \cdot (S_1 - S_2) + F_1 + Pm_1 \cdot (S_3 - S_4) - F_2 - Prw \cdot S_1 = 0$$

The rear wheel cylinder pressure Prw is to ascend along the CC' straight line in FIG. 2, which can be represented by the following equation:

$$Prw = \frac{(S_1 - S_2) + (S_3 - S_4)}{S_1} \cdot Pm_1 + \frac{F_1 - F_2}{S_1}$$

It proves that a much larger braking power for the rear wheels, enough to halt the vehicle, can be achieved in comparison to the both-circuits-normal case. In either case, both-circuits-normal and front-circuit-failure, the differential piston 21 of the control valve 10 in this embodiment is operated in order to supply substantially ideal braking pressure to the rear wheel cylinders 6, 6'. In either case the vehicle is halted effectively and safely as well.

The above detailedly described embodiment is only for an example. This invention should not be construed to be limited to this embodiment, but many modifications and variations are possible to those skilled in the art.

Figure 3:
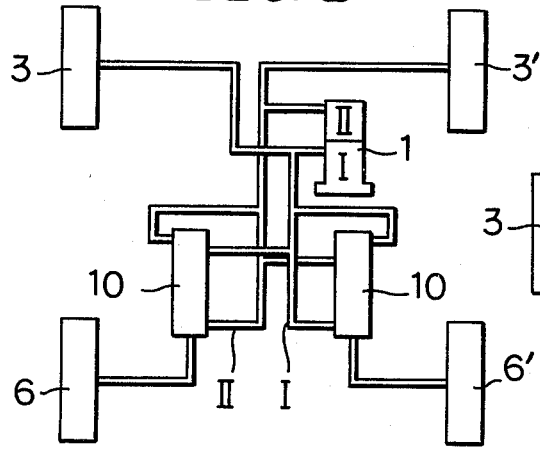
FIGS. 3, 4, and 5 are all plan diagrams respectively showing other embodiments of this invention.

This invention is also applicable to a so-called diagonal circuit system, wherein a pair of control valves 10 are disposed each in one diagonally connected hydraulic circuit, for example, a front and a rear wheel cylinders 3, 6', and the other front and the other rear wheel cylinders 3', 6, as shown in FIG. 3. In this arrangement, this invention can show a similar characteristic line comparable to the ideal line in high precision, either in both-circuits-normal and one-circuit-failure cases.

Figure 4:
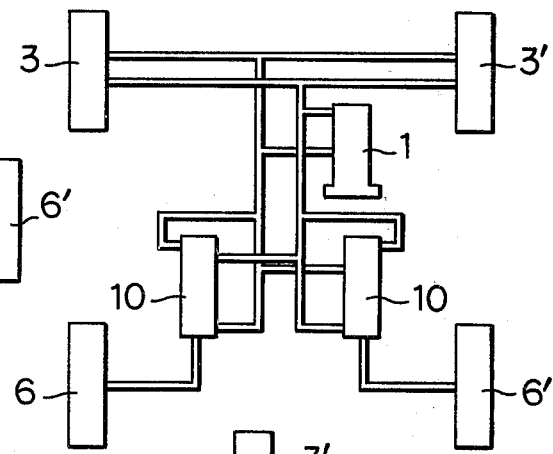
Figure 5:
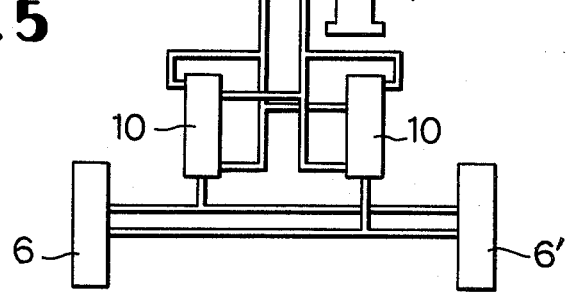

In a dual hydraulic circuit shown in FIG. 4, wherein two front wheel cylinders and any one rear wheel cylinder are connected in one circuit and two front wheel cylinders and the other rear wheel cylinder are also connected in the other circuit, a substantially identical effect has been proved. It is also possible to apply this invention to a case wherein all of the front and rear wheels are respectively connected by a double conduit system, i.e., are supplied pressure by two of the mutually independent conduit systems. The braking effect has been proved to the same extent.

Furthermore, the shape of the differential piston 21 is not limited to the above embodiment in FIG. 1, wherein the diameter of the first small diameter portion 21b of the differential piston 21 is made equal to that of the valve piston 13, with the object of facilitating machining of the housing 11, while satisfying the predetermined condition as to the area ratio between the second pressure-receiving face 21d and the first pressure-receiving face 21e of the differential piston 21. The second small diameter portion 21c is required to be formed, in fact, in order to meet the above conditions. The first small diameter portion 21b of the differential piston is not absolutely required to be equal in the diameter dimension to the valve piston 13. If this condition can be released the second small diameter portion 21c itself may be omitted.

What is claimed is:

1. A dual type hydraulic circuit for a vehicle brake, which circuit includes (a) a master cylinder provided with first and a second mutually independent pressure chambers in which respective fluid pressure is produced; (b) front wheel cylinders disposed on the left- and right front wheels and rear wheel cylinders disposed on the left- and right rear wheels of a vehicle; (c) a first conduit system connecting a plurality of said wheel cylinders, in which at least one rear wheel cylinder is included, and said first pressure chamber of said master cylinder; (d) a second conduit system connecting all of said wheel cylinders except those connected to said first conduit system and said second pressure chamber of said master cylinder; and (e) a control valve disposed in the midway of said first conduit system for controlling the braking fluid pressure to said rear wheel cylinder connected to said first conduit system, said control valve comprising:

(i) a proportioning valve which has a valve piston to shut a passage formed in said proportioning valve for controlling the hydraulic pressure in said rear wheel cylinder connected to said first conduit system so as to rise at a milder gradient than that in said first pressure chamber of said master cylinder, when the rising hydraulic pressure therein exceeds a predetermined value;

(ii) a differential piston which has a small diameter portion and a large diameter portion, said small diameter portion being adjacent to the end of said valve piston and spaced therefrom a larger distance than the distance required for the movement of said valve piston in shutting said passage, and said large diameter portion having on the same side of said small diameter portion a second pressure-receiving face which is affected by the pressure in said second conduit system and a first pressure-receiving face on the opposite side thereof being larger in area than said second pressure-receiving face and affected by the pressure in said first conduit system; and (iii) spring means for constantly biasing said differential piston in a direction away from said valve piston, whereby said differential piston controls said proportioning valve in accordance with the balance relation between the force due to the hydraulic power acting on said first and second pressure-receiving faces and the resilient force of said spring means.

2. A dual type hydraulic circuit for a vehicle brake as set forth in claim 1, wherein said first conduit system is connected to the left- and right rear wheel cylinders and said second conduit system is connected to the left- and right front wheel cylinders, and said control valve is disposed, one in number, at a position upstream of the diverging point to the left- and right rear wheel cylinders.

3. A dual type hydraulic circuit for a vehicle brake as set forth in claim 1, wherein said first conduit system is connected to the right front wheel cylinder and the left rear wheel cylinder, and said second conduit system is connected to the left front wheel cylinder and the right rear wheel cylinder, and said control valve is disposed one in each conduit system at a position where said first and second conduit systems are connected to respective rear wheel cylinder.

4. A dual type hydraulic circuit for a vehicle brake as set forth in claim 1, wherein said first conduit system is connected to a pair of left- and right front wheel cylinders and the right rear wheel cylinder and said second conduit system is connected to another pair of left- and right wheel cylinders and the left rear wheel cylinder, and said control valve is disposed one in each conduit system at a position where said first and second conduit systems are connected to respective rear wheel cylinder.

5. A dual type hydraulic circuit for a vehicle brake as set forth in claim 1, wherein said first conduit system is connected to a pair of left- and right wheel cylinders and a pair of left- and right rear wheel cylinders, and said second conduit system is connected to another pair of left- and right front wheel cylinders and another pair of left- and right rear wheel cylinders, and said control valve is disposed one in each conduit system at a position upstream of the diverging point to said left- and right rear wheel cylinders.

6. A dual type hydraulic circuit for a vehicle brake as set forth in claim 1, wherein said valve piston is exposed at one end thereof to an air chamber and said small diameter portion of said differential piston is in said air chamber adjacent to and spaced from said one end of said valve piston.

7. A dual type hydraulic circuit for a vehicle brake as set forth in claim 6, wherein said small diameter portion of said differential piston and the end portion of said valve piston adjacent each other are of same diameter.

8. A dual type hydraulic circuit for a vehicle brake as set forth in claim 6, wherein said differential piston is provided with a second small diameter portion protruding from said large diameter portion, on the opposite side where said small diameter portion is provided, said second small diameter portion is smaller in diameter than said small diameter portion and exposed to another air chamber.

* * * * *